United States Patent

Yang

[11] Patent Number: 5,909,656
[45] Date of Patent: Jun. 1, 1999

[54] PROTECTIVE RELAY WITH IMPROVED DFT FUNCTION

[75] Inventor: Lifeng Yang, Coral Springs, Fla.

[73] Assignee: ABB Power T&D Company Inc., Raleigh, N.C.

[21] Appl. No.: 08/811,646

[22] Filed: Mar. 5, 1997

[51] Int. Cl.[6] .................................................. G06F 17/14
[52] U.S. Cl. ............................... 702/77; 702/66; 702/64; 364/528.27; 364/528.28; 364/726.03; 324/522; 324/76.21; 361/160; 361/86; 361/87
[58] Field of Search .......................... 702/66, 67, 69–77, 702/79, 106, 124, 126, 185, 189–191, 194, 195, 57–59, 64, 65; 364/528.28, 528.29, 528.3, 726.02, 726.03, 826, 827, 528.27; 361/113, 35, 20, 83, 30, 31, 33, 79, 85–87, 160, 166, 170; 324/522, 76.19, 76.21, 76.22, 76.24

[56] References Cited

U.S. PATENT DOCUMENTS

| | | | |
|---|---|---|---|
| 4,587,626 | 5/1986 | Gray | 364/726.03 |
| 5,172,329 | 12/1992 | Rahman et al. | 364/528.28 |
| 5,406,495 | 4/1995 | Hill | 702/72 |
| 5,453,903 | 9/1995 | Chow | 361/79 |
| 5,592,393 | 1/1997 | Yalla | 364/528.28 |
| 5,671,112 | 9/1997 | Hu et al. | 361/86 |

OTHER PUBLICATIONS

Lian, C.Z., "Direct Current Error Compensation of Fourier Method," 4th Protective Relaying and Automation Meeting of CIEE (Chinese Institution of Electrical Engineers), Oct. 1986. Chinese language copy and copy of English translation enclosed.

*Primary Examiner*—Hal Dodge Wachsman
*Attorney, Agent, or Firm*—Woodcock Washburn Kurtz Mackiewicz & Norris LLP

[57] ABSTRACT

A method for applying a modified Discrete Fourier Transform (DFT) in a protective relaying system involves five basic steps: The first step, S1, comprises measuring voltage and current time-domain samples v(k), i(k). The next step, S2, involves the computation of the DFT of the DC component(s) ($V_{DC}(k)$, $I_{DC}(k)$) of the voltage and current samples. The next step, S3, comprises the computation of the regular DFT (V(k), I(k)). Next, in step S4, the modified DFTs are computed as, $V_m(k)=V(k)-V_{DC}(k)$, and $I_m(k)=I(k)-I_{DC}(k)$. In step S5 the modified DFT values representing the desired phasors are employed to carry out various protective relaying functions.

6 Claims, 2 Drawing Sheets

PROTECTIVE RELAY WITH IMPROVED DFT FUNCTION

FIELD OF THE INVENTION

The present invention relates generally to protective relaying, and more particularly to a microprocessor- or DSP-based protective relay with an improved Discrete Fourier Transform (DFT) function.

BACKGROUND OF THE INVENTION

Electrical transmission lines and power generation equipment must be protected against faults and consequent short circuits, which could cause a collapse of the power system, equipment damage, and personal injury. It is the function of the protective relays, which monitor AC voltages and currents, to locate line faults and initiate isolation by the tripping of circuit breakers. Protective relays generally perform one or more of the following functions: (a) monitoring the system to ascertain whether it is in a normal or abnormal state; (b) metering, which involves measuring certain electrical quantities for operational control; (c) protection, which typically involves tripping a circuit breaker in response to the detection of a short-circuit condition; and (d) alarming, which provides a warning of some impending problem. Fault location, e.g., is associated with the protection function and involves measuring critical system parameters and, when a fault occurs, quickly making a rough estimate of the fault location and of certain characteristics of the fault so that the power source can be isolated from the faulted line; thereafter, the system makes a comprehensive evaluation of the nature of the fault.

Modern protective relays employ microprocessors and/or digital signal processors (DSPs) to process the voltage and current waveforms measured on the protected transmission line (the term "transmission line" as employed herein is intended to cover any type of electrical conductor, including high power conductors, feeders, and transformer windings). Such processing may include the computation of a DFT. For example, U.S. Pat. No. 5,592,393, Jan. 7, 1997, titled "Method and System for Providing Protective Relay Functions," describes a system that uses the DFT function to compute instantaneous values of fundamental, second harmonic and fifth harmonic components. U.S. Pat. No. 5,172,329, Dec. 15, 1992, "Microprocessor Digital Protective Relay for Power Transformers," describes a system that uses the DFT function to compute voltage and current phasors.

The conventional DFT exhibits poor performance if the input signal contains a decaying DC component having a continuous frequency spectrum. Therefore, the DC signal component, or offset, is typically filtered out of the input signal before the DFT function is carried out. There are a number of the methods to deal with such DC offset, including the use of: (1) a digital mimic circuit, (2) half-cycle and full-cycle compensation, (3) a parallel filter, and (4) a cosine filter. However, certain problems are associated with each of these methods. The digital mimic circuit is very sensitive to noise and degrades the response of the DFT in the presence of noise. The half-cycle and full-cycle compensation techniques are similar, and both cause computational problems when the decaying DC component is very small. The disadvantages of the parallel filter method are that line time constant is needed for an integration filter and the computation burden is high. The cosine filter exhibits poor performance in attenuating harmonics, and also may involve a quarter-cycle delay in obtaining an orthogonal part of the DFT. The latter may be a significant disadvantage in applications in which speed is crucial.

SUMMARY OF THE INVENTION

Accordingly, a primary object of the present invention is to provide an improved DFT process and protective relay utilizing the improved DFT. The invention is especially intended for protective relaying applications in which accurate voltage and current phasors must be derived.

A method or system for deriving a phasor representation of a current or voltage waveform in accordance with the present invention comprises the steps of, or means for, measuring time-domain samples (v(k), i(k)) of the waveform; computing, on the basis of the samples, a DFT ($V_{DC}(k)$, $I_{DC}(k)$) of the decaying DC component of the waveform; computing a DFT (V(k), I(k)) of the waveform; computing a modified DFT ($V_m(k)$, $I_m(k)$) as a function of the DFT (V(k), I(k)) and the DFT, $V_{DC}(k)$ and/or $I_{DC}(k)$, of the DC component, wherein the modified DFT yields the desired phasor; and performing a prescribed protective relaying function using the phasor. The prescribed relaying function may include, e.g., fault typing and/or fault location, although many other applications for phasors are known. Moreover, in the presently preferred embodiments of the invention, the modified DFT is computed in accordance with the equations, $$V_m(k) = V(k) - V_{DC}(k) \text{ or}$$

$$I_m(k) = I(k) - I_{DC}(k)$$

where V(k) and I(k) represent the regular DFTs of the voltage and current waveforms, respectively, and $V_{DC}(k)$ and $I_{DC}(k)$ represent the DFTs of the DC components of the voltage and current waveforms. These DFTs are computed in accordance with the algorithms described below in connection with a detailed description of the presently preferred embodiments. The DFT algorithms involve certain parameters in addition to the sample data to be transformed by the DFT. Such parameters include the number of samples per cycle, denoted "N", the time constant defining the rate at which the DC component decays, denoted "T1", and the sample interval, denoted "$T_s$". For example, if analog voltage and current signals are sampled at a rate of 24 samples per power system cycle, then N will be 24 and $T_s$, the time period between successive samples, will be 1/fN. Other features of the invention are disclosed below.

DETAILED DESCRIPTION OF PREFERRED EMBODIMENTS

Figure 1:
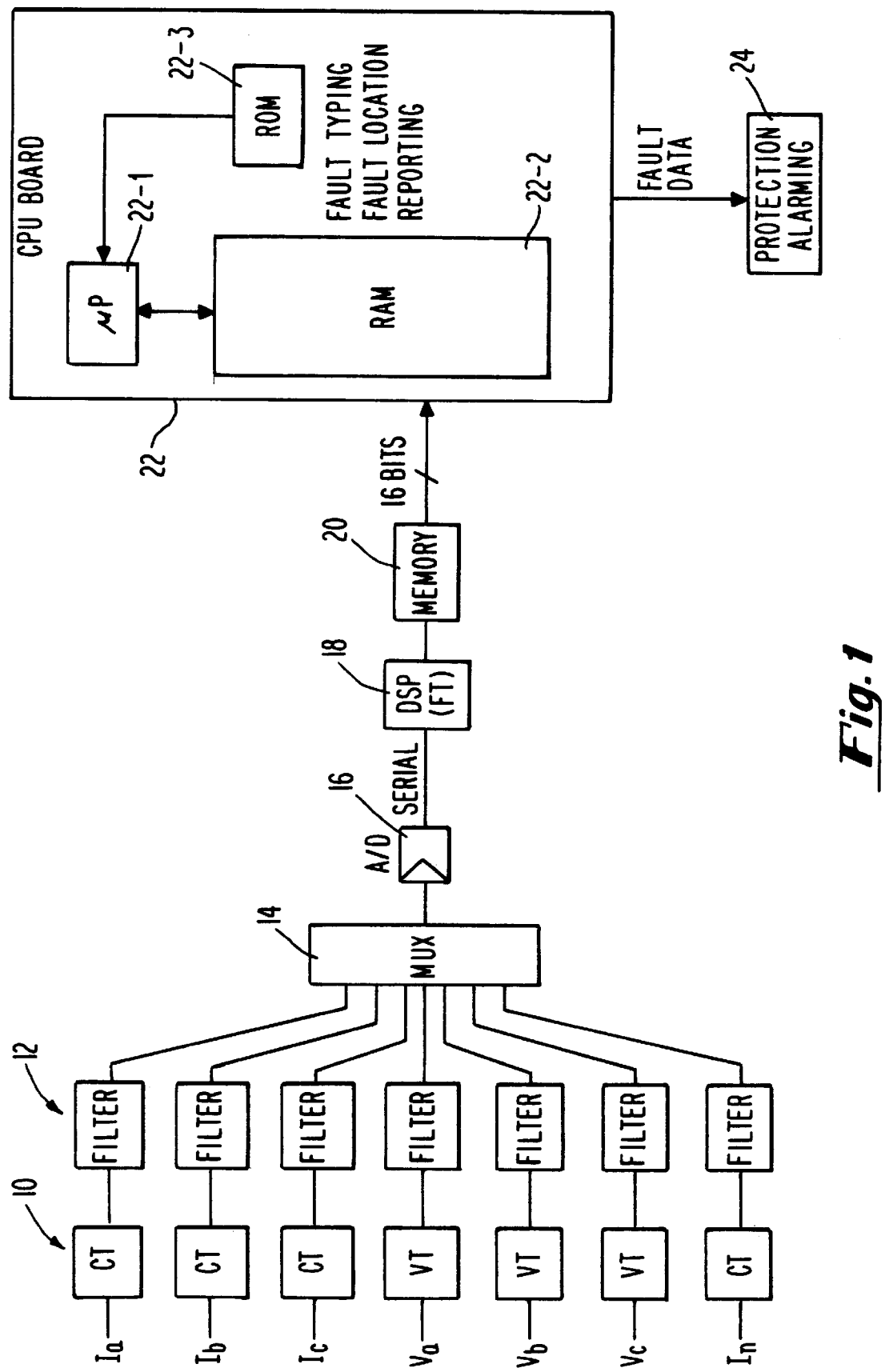
FIG. 1 schematically depicts a protective relay in accordance with the present invention.

FIG. 1 depicts one presently preferred embodiment of a microprocessor-based protective relay in accordance with the present invention. As shown, the relay comprises current and voltage transducers 10, filters 12, and a multiplexor 14, the latter outputting an interleaved stream of analog phase current and voltage signal samples, as well as neutral current samples. The analog multiplex output by the multiplexor 14 is digitized by an analog-to-digital converter 16. The output of the analog-to-digital converter 16 is fed to a DSP 18. The DSP 18 employs a DFT, described below, to produce phasor data for each of the sampled channels. The phasor data is stored in a memory 20. The phasor data in the memory 20 is fed via a data bus to a central processing unit (CPU) board 22. The CPU board 22 includes a microprocessor 22-1, random access memory 22-2, and read only memory (ROM) 22-3. The ROM 22-3 contains program code controlling the microprocessor 22-1 in performing fault typing, fault location, reporting, and other protective relaying functions. The random access memory 22-2 may include a pre-fault segment of memory and a post-fault segment of memory, which may be employed (as described, e.g., in U.S. Pat. No. 5,428,549, Jun. 27, 1995, "Transmission Line Fault Location System") in performing the various protective relaying functions. The CPU board 22 may output fault data to a protection/alarming block 24 that performs protection and alarming functions such as tripping a circuit breaker or sounding an alarm as appropriate.

Figure 2:
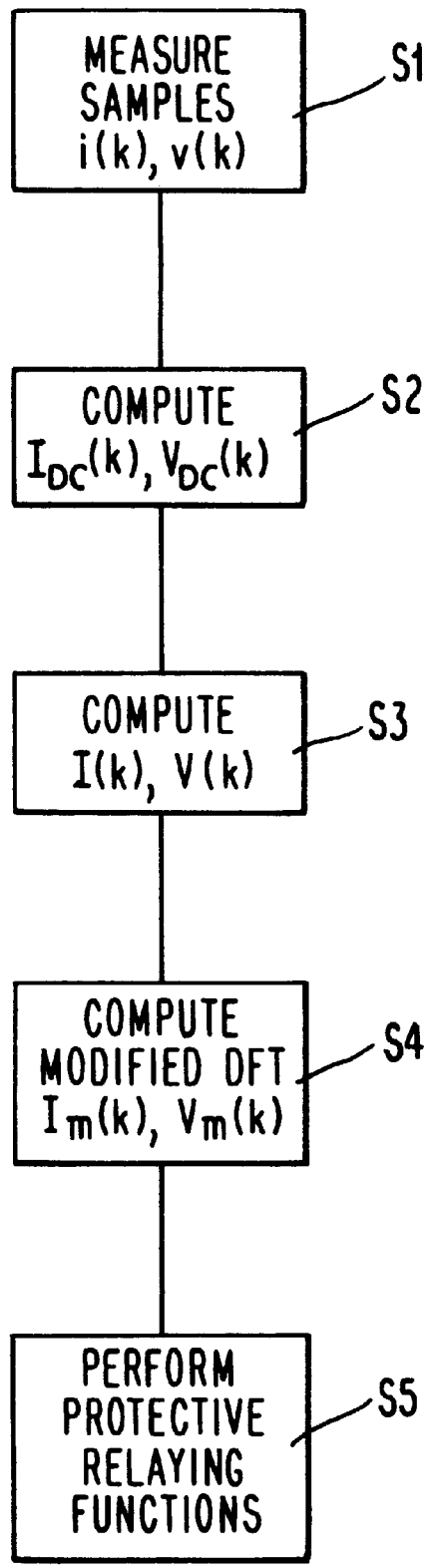
FIG. 2 is a flowchart of a DFT process in accordance with the present invention.

FIG. 2 is a flowchart of a modified DFT process or method in accordance with the present invention. The modified DFT process will first be explained generally with reference to FIG. 2, and then a detailed mathematical explanation will be provided.

The presently preferred application of the modified DFT involves a protective relay of the kind depicted in FIG. 1. The inventive process for applying the modified DFT includes five basic steps, denoted S1 through S5 in FIG. 2. The first step, S1, comprises measuring voltage and current time-domain samples v(k), i(k), where k is an index referring to the sample number. The next step, S2, involves the computation of the DFT of the DC component(s) ($V_{DC}(k)$, $I_{DC}(k)$) of the voltage and/or current samples (whether voltage or current samples, or both, are used to compute the DFT will depend upon the particular relaying application(s) involved). The next step, S3, comprises the computation of the regular DFT (V(k), I(k)) of the voltage and/or current component(s). Next, in step S4, the modified DFTs are computed as, $$V_m(k) = V(k) - V_{DC}(k), \text{ and}$$

$$I_m(k) = I(k) - I_{DC}(k).$$

(In some applications it will only be necessary to compute the modified voltage or current DFT.) In step S5 the modified DFT values, which represent the desired phasor(s), are used to perform the various well known protective relaying or similar power system functions.

Procedure for Computing Modified DFT

A procedure for computing a modified current DFT $I_m(k)$ in accordance with the present invention will now be described in detail. In the following description, the transformed signal is assumed to be a current waveform i(t) measured on one of the phase conductors of a transmission line. It will be apparent to those skilled in the art that the same algorithm could be used to derive the voltage transform $V_m(k)$.

The inventive DFT procedure provides an efficient way to obtain accurate phasor representations of the current and voltage waveforms on a transmission line. As discussed above, the effects of a decaying DC component are minimized. The invention requires one more time domain samples and a regular DFT data window. The procedure may be carried out by first computing the desired phasor using the regular DFT for a certain length of data window, and then using one sample that is one cycle before to do the corrections. The computational burden involved in the correction is small and the time delay is just one sample.

The regular DFT can be stated as:

$$I(k) = \frac{2}{K} \sum_{n=1}^{K} i(k-K+n) e^{\left(-j\frac{2n\pi}{N}\right)}$$

If the signal contains only a decaying DC component, $$i(t) = Be^{\left(-\frac{t}{T_1}\right)}$$

(where T1 is the decay time constant and B is a constant) then the DFT output becomes, $$I(k) = \frac{2}{K} \sum_{n=1}^{K} Be^{\left(-\frac{k-K+n}{T_1} T_s\right)} e^{\left(-j\frac{2n\pi}{N}\right)}$$

$$I(k) = \frac{2}{K} Be^{\left(-(k-K)\frac{T_s}{T_1}\right)} \sum_{n}^{K} e^{-\left(\frac{T_s}{T_1}+j\frac{2\pi}{N}\right)n}$$

$$I(k) = \frac{2}{K} Be^{\left(-(k-K)\frac{T_s}{T_1}\right)} \cdot \frac{e^{-\left(\frac{T_s}{T_1}+j\frac{2\pi}{N}\right)} - e^{-\left(\frac{T_s}{T_1}+j\frac{2\pi}{N}\right)(K+1)}}{1 - e^{-\left(\frac{T_s}{T_1}+j\frac{2\pi}{N}\right)}}$$

For $K = N/2$, $$I(k) = \frac{4}{N} \frac{\left(Be^{-\left(k-\frac{N}{2}\right)\frac{T_s}{T_1}} + Be^{-k\frac{T_s}{T_1}}\right) e^{-\frac{T_s}{T_1}}}{e^{j\frac{2\pi}{N}} - e^{-\frac{T_s}{T_1}}}$$

$$I_{dc}(k) = \left(i(k) + i\left(k - \frac{N}{2}\right)\right) \frac{4}{N} (MF1 + jMF2)$$

$$MF1 = \frac{\cos\left(\frac{2\pi}{N}\right) - e^{-\frac{T_s}{T_1}}}{e^{\frac{T_s}{T_1}} - 2\cos\left(\frac{2\pi}{N}\right) + e^{-\frac{T_s}{T_1}}}$$

$$MF2 = \frac{-\sin\left(\frac{2\pi}{N}\right)}{e^{\frac{T_s}{T_1}} - 2\cos\left(\frac{2\pi}{N}\right) + e^{-\frac{T_s}{T_1}}}$$

Similarly, for K=N, $$I_{dc}(k) = (i(k-N) - i(k)) \frac{2}{N} (MF1 + jMF2)$$

Now let us examine what would happen where the signal contains the fundamental (sin(ωt)) and all harmonics (sin (nωt)) in addition to the decaying DC ($e^{-t/T_1}$). Assume that the time domain signal has the following form:

$$i(t) = Be^{-\frac{t}{T_1}} + \sum_{n=1}^{\infty} c_n \sin(n\omega t)$$

$$i\left(k - \frac{N}{2}\right) + i(k) = Be^{\left(-k-\frac{N}{2}\right)\frac{T_s}{T_1}} + Be^{-k\frac{T_s}{T_1}} + 2\sum_{n=1}^{\infty} c_{2n}\sin(2n\omega t)$$

$$i(k-N) - i(k) = Be^{-\left(k-\frac{N}{2}\right)\frac{T_s}{T_1}} - Be^{-k\frac{T_s}{T_1}}$$

It is seen that for the half-cycle correction (i(k-N/2)+i(k)), the odd harmonics (sin(n$\omega$t)) are canceled but the even harmonics (sin(2n$\omega$t)) remain and are doubled in magnitude. Therefore, the even harmonics contribute an error in the correction. In contrast, the full cycle correction (i(k-N)-i(k)) eliminates all harmonics. It should be noted that we assume the decaying DC component starts after the fault's inception; therefore the minimum data window will be (N/2+1) for the half-cycle correction and (N+1) for the full-cycle correction.

We have now developed the formulas for estimating the regular DFT error due to a decaying DC component for both half-cycle and full-cycle DFT algorithms. The correction of the regular DFT output may now be stated as follows: Given the output from the regular DFT, $$I(k) = \frac{2}{K}\sum_{n=1}^{K} i(k - K + n) \cdot e^{-j\frac{2\pi}{N}}$$
$$= I_c(k) - jI_s(k)$$

then the modified DFT output ($I_m(k)$) will be, $$I_m(k) = I(k) - I_{dc}(k)$$

The method described above can be used to derive voltage and current phasors when a DC component is present. The effectiveness of this method depends upon the line time constant T1. In other words, the invention will be most effective when the estimated line time constant in the correction is close to the actual time constant. For power system relaying applications, different line time constants may be used for voltage and current signals. For example, a voltage signal v(t) from a potential transformer typically contains a very small DC component, and so it may not be necessary to make any corrections to the DFT phasor. However, if the voltage is taken from a capacitor coupled voltage transformer (CCVT), it may contain a significant, long lasting DC component for a low voltage fault. In this case, DC correction may be desirable, and a larger time constant T1 may be used. For a current signal, the time constant may be obtained from the zone-one reach impedance. The time constant T1 may be defined as the ratio of the line inductance to the line resistance. It is a measure of the rate at which the DC component decays. Thus, for example, if the line impedance is Z=R+jX, T1=X/2$\pi$fR, where f is the power system frequency.

The DC correction method is simple and efficient, and requires only one extra sample to obtain the modification factors (MF1 and MF2). The modification factors can be computed off-line or on-line during relay initialization. Since these factors are common to the half-cycle DFT and full-cycle DFTs, it is very convenient to perform adaptive DFT calculations. Moreover, real-time computations are practical since the computational burden is very small, and thus the invention is suitable for use in high-speed relaying applications.

Those skilled in the protective relaying art will recognize that there are a variety of uses for phasors of the kind yielded by the improved DFT provided by the present invention. For example, phasors are used in power system protection (e.g., level detection (threshold units), direction discrimination, fault distance estimation, out of step detection, and fault location). Phasors are also used in the fields of power measurement (voltage, current and power metering), power flow analysis, state estimation, and power system control. Voltage and current phasors, e.g., are essential to carrying out many different calculation and decision making processes in the frequency domain. Since errors in the phasor calculations can result in erroneous decisions, it is important that the phasors used in the decision making process be accurate. The present invention provides such accurate phasors.

The above description of preferred embodiments of the invention is not intended to limit the scope of protection of the following claims. Thus, for example, except where they are expressly so limited, the claims are not limited to applications involving three-phase power systems or power systems employing a 60 Hz or 50 Hz fundamental frequency. Moreover, the claims are not limited to systems associated with any particular part (i.e., transformer, feeder, high power transmission line, etc.) of a power distribution system.

I claim:

1. A method for deriving a phasor representation of a current or voltage waveform on a transmission line, wherein said waveform includes a decaying DC component, comprising the steps of:

(a) measuring time-domain samples (v(k) or i(k)) of said waveform, where k is an index referring to the sample number;

(b) computing, on the basis of said samples a, Discrete Fourier Transform (DFT) of the decaying DC component ($V_{DC}(k)$ or $I_{DC}(k)$) of the waveform;

(c) computing a DFT (V(k) or I(k)) of said waveform, said DFT (V(k) or I(k)) being computed in accordance with the equation(s):

$$I(k) = \frac{2}{K}\sum_{n=1}^{K} i(k - K + n) \cdot e^{\left(-j\frac{2n\Pi}{N}\right)}$$

where K and N are predefined constants and where n is an index referring to the sample number;

(d) computing a modified DFT ($V_m(k)$ or $I_m(k)$) as a function of said DFT (V(k) or I(k)) and said DFT of said DC component ($V_{DC}(k)$ or $I_{DC}(k)$), where m is an index referring to a modified sample number, wherein said modified DFT yields said phasor and wherein K=N/2 and said DFT of the decaying DC component ($I_{DC}(k)$) is computed in accordance with the equation:

$$I_{dc}(k) = \left(i(k) + i\left(k - \frac{N}{2}\right)\right)\frac{4}{N}(MF1 + jMF2)$$

where MF1 and MF2 are modification factors and are derived as follows:

$$MF1 = \frac{\cos\left(\frac{2\Pi}{N}\right) - e^{\frac{-T_s}{T_1}}}{e^{\frac{T_s}{T_1}} - 2\cos\left(\frac{2\Pi}{N}\right) + e^{\frac{-T_s}{T_1}}}$$

$$MF2 = \frac{-\sin\left(\frac{2\Pi}{N}\right)}{e^{\frac{T_s}{T_1}} - 2\cos\left(\frac{2\Pi}{N}\right) + e^{\frac{-T_s}{T_1}}}$$

wherein N is the number of samples per cycle, T1 is a time constant defining a rate at which the DC component decays, and $T_s$ is a sample interval; and (e) performing a prescribed power system or protective relaying function using said phasor.

2. A method for deriving a phasor representation of a current or voltage waveform on a transmission line, wherein said waveform includes a decaying DC component comprising the steps of:

(a) measuring time-domain samples (v(k) or i(k)) of said waveform, where k is an index referring to the sample number;

(b) computing, on the basis of said samples, a Discrete Fourier Transform (DFT) of the decaying DC component ($V_{DC}(k)$ or $I_{DC}(k)$) of the waveform;

(c) computing a DFT V(k) or I(k)) of said waveform, said DFT (V(k) or I(k)) being computed in accordance with the equation(s):

$$I(k) = \frac{2}{K}\sum_{n=1}^{K} i(k-K+n) \cdot e^{\left(-j\frac{2n\Pi}{N}\right)}$$

where K and N are predefined constants and where n is an index referring to the sample number;

(d) computing a modified DFT ($V_m(k)$ or $I_m(k)$) as a function of said DFT (V(k) or I(k)) and said DFT of said DC component ($V_{DC}(k)$ or $I_{DC}(k)$), where m is an index referring to a modified sample number, wherein said modified DFT yields said phasor; and wherein K=N and said DFT of the decaying DC component ($I_{DC}(k)$) is computed in accordance with the equation:

$$I_{dc}(k) = (i(k-N) - i(k))\frac{2}{N}(MF1 + jMF2)$$

where MF1 and MF2 are modification factors and are derived as follows:

$$MF1 = \frac{\cos\left(\frac{2\Pi}{N}\right) - e^{\frac{-T_s}{T_1}}}{e^{\frac{T_s}{T_1}} - 2\cos\left(\frac{2\Pi}{N}\right) + e^{\frac{-T_s}{T_1}}}$$

$$MF2 = \frac{-\sin\left(\frac{2\Pi}{N}\right)}{e^{\frac{T_s}{T_1}} - 2\cos\left(\frac{2\Pi}{N}\right) + e^{\frac{-T_s}{T_1}}}$$

wherein N is the number of samples per cycle, T1 is a time constant defining a rate at which the DC component decays, and $T_s$ is a sample interval; and (e) performing a prescribed power system or protective relaying function using said phasor.

3. A method for deriving a phasor representation of a current or voltage waveform on a transmission line, wherein said waveform includes a decaying DC component, comprising the steps of:

(a) measuring time-domain samples (v(k) or i(k)) of said waveform, where k is an index referring to the sample number;

(b) computing, on the basis of said samples, a Discrete Fourier Transform (DFT) of the decaying DC component ($V_{DC}(k)$ or $I_{DC}(k)$) of the waveform;

(c) computing a DFT (V(k) or I(k)) of said waveform;

(d) computing a modified DFT ($V_m(k)$ or $I_m(k)$) as a function of said DFT (V(k) or I(k)) and said DFT of said DC component ($V_{DC}(k)$ or $I_{DC}(k)$), where m is an index referring to a modified sample number, wherein said modified DFT yields said phasor, and wherein (1) said modified DFT is computed in accordance with the equations, $V_m(k) = V(k) - V_{DC}(k)$ or $I_m(k) = I(k) - I_{DC}(k)$;

(2) said DFT (V(k) or I(k)) is computed in accordance with the equation:

$$I(k) = \frac{2}{K}\sum_{n=1}^{K} i(k-K+n) \cdot e^{\left(-j\frac{2n\Pi}{N}\right)}$$

wherein K and N are predefined constants;

(3) said DFT of the DC component is computed in accordance with one of the following equations:

(i) for K=N/2, $$I_{dc}(k) = \left(i(k) + i\left(k - \frac{N}{2}\right)\right)\frac{4}{N}(MF1 + jMF2)$$

and, (ii) for K=N, $$I_{dc}(k) = (i(k-N) - i(k))\frac{2}{N}(MF1 + jMF2)$$

where MF1 and MF2 are modification factors and are derived as follows;

$$MF1 = \frac{\cos\left(\frac{2\pi}{N}\right) - e^{\frac{-T_s}{T_1}}}{e^{\frac{T_s}{T_1}} - 2\cos\left(\frac{2\pi}{N}\right) + e^{\frac{-T_s}{T_1}}}$$

$$MF2 = \frac{-\sin\left(\frac{2\pi}{N}\right)}{e^{\frac{T_s}{T_1}} - 2\cos\left(\frac{2\pi}{N}\right) + e^{\frac{-T_s}{T_1}}}$$

wherein N is the number of samples per cycle, T1 is a time constant defining a rate at which the DC component decays, and $T_s$ is a sample interval; and (e) performing a prescribed power system or protective relaying function using said phasor.

4. A system for deriving a phasor representation of a current or voltage waveform on a transmission line, wherein said waveform includes a decaying DC component, comprising:

(a) means for measuring time-domain samples (v(k) or i(k)) of said waveform where k is an index referring to the sample number;

(b) means for computing, on the basis of said samples, a Discrete Fourier Transform (DFT) of the decaying DC component ($V_{DC}(k)$ or $I_{DC}(k)$) of the waveform;

(c) means for computing a DFT (V(k) or I(k)) of said waveform, said DFT (V(k) or I(k)) being computed in accordance with the equation(s):

$$I(k) = \frac{2}{K}\sum_{n=1}^{K} i(k - K + n) \cdot e^{\left(-j\frac{2n\Pi}{N}\right)}$$

wherein K and N are predefined constants and wherein n is an index referring to the sample number;

(d) means for computing a modified DFT ($V_m(k)$ or $I_m(k)$) as a function of said DFT (V(k) or I(k)) and said DFT of said DC component ($V_{DC}(k)$ or $I_{DC}(k)$), where m is an index referring to a modified sample number, wherein said modified DFT yields said phasor and wherein K=N/2 and said DFT of the decaying DC component ($I_{DC}(k)$) is computed in accordance with the equation:

$$I_{dc}(k) = \left(i(k) + i\left(k - \frac{N}{2}\right)\right)\frac{4}{N}(MF1 + jMF2)$$

where MF1 and MF2 are modification factors and are derived as follows:

$$MF1 = \frac{\cos\left(\frac{2\Pi}{N}\right) - e^{\frac{-T_s}{T_1}}}{e^{\frac{T_s}{T_1}} - 2\cos\left(\frac{2\Pi}{N}\right) + e^{\frac{-T_s}{T_1}}}$$

$$MF2 = \frac{-\sin\left(\frac{2\Pi}{N}\right)}{e^{\frac{T_s}{T_1}} - 2\cos\left(\frac{2\Pi}{N}\right) + e^{\frac{-T_s}{T_1}}}$$

wherein N is the number of samples per cycle, T1 is a time constant defining a rate at which the DC component decays, and $T_s$ is a sample interval; and (e) means for performing a prescribed protective relaying function using said phasor.

5. A system for deriving a phasor representation of a current or voltage waveform on a transmission line, wherein said waveform includes a decaying DC component, comprising:

(a) means for measuring time-domain samples (v(k) or i(k)) of said waveform where k is an index referring to the sample number;

(b) means for computing, on the basis of said samples, a Discrete Fourier Transform (DFT) of the decaying DC component ($V_{DC}(k)$ or $I_{DC}(k)$) of the waveform;

(c) means for computing a DFT (V(k) or I(k)) of said waveform said DFT V(k) or I(k) is computed in accordance with the equation(s):

$$I(k) = \frac{2}{K}\sum_{n=1}^{K} i(k - K + n) \cdot e^{\left(-j\frac{2n\Pi}{N}\right)}$$

wherein K and N are predefined constants and wherein n is an index referring to the sample number;

(d) means for computing a modified DFT ($V_m(k)$ or $I_m(k)$) as a function of said DFT (V(k) or I(k)) and said DFT of said DC component ($V_{DC}(k)$ or $I_{DC}(k)$), where m is an index referring to a modified sample number, wherein said modified DFT yields said phasor and wherein K=N and said DFT of the decaying DC component ($V_{DC}(k)$) is computed in accordance with the equation:

$$I_{dc}(k) = (i(k - N) - i(k))\frac{2}{N}(MF1 + jMF2)$$

where MF1 and MF2 are modification factors and are derived as follows:

$$MF1 = \frac{\cos\left(\frac{2\Pi}{N}\right) - e^{\frac{-T_s}{T_1}}}{e^{\frac{T_s}{T_1}} - 2\cos\left(\frac{2\Pi}{N}\right) + e^{\frac{-T_s}{T_1}}}$$

$$MF2 = \frac{-\sin\left(\frac{2\Pi}{N}\right)}{e^{\frac{T_s}{T_1}} - 2\cos\left(\frac{2\Pi}{N}\right) + e^{\frac{-T_s}{T_1}}}$$

wherein N is the number of samples per cycle, T1 is a time constant defining a rate at which the DC component decays, and $T_s$ is a sample interval.

6. A system for deriving a phasor representation of a current or voltage waveform on a transmission line, wherein said waveform includes a decaying DC component, comprising:

(a) means for measuring time-domain samples (v(k) or i(k)) of said waveform where k is an index referring to the sample number;

(b) means for computing, on the basis of said samples, a Discrete Fourier Transform (DFT) of the decaying DC component ($V_{DC}(k)$ or $I_{DC}(k)$) of the waveform;

(c) means for computing a DFT (V(k) or I(k)) of said waveform;

(d) means for computing a modified DFT ($V_m(k)$ or $I_m(k)$) as a function of said DFT (V(k)) or I(k)) and said DFT of said DC component ($V_{DC}(k)$ or $I_{DC}(k)$), wherein m is an index referring to a modified sample number, wherein said modified DFT yields said phasor; and wherein:

(1) said modified DFT is computed in accordance with the equations, $V_m(k)=V(k)-V_{DC}(k)$ or $I_m(k)=I(k)-I_{DC}(k)$;

(2) said DFT (V(k), I(k)) is computed in accordance with the equation:

$$I(k) = \frac{2}{K}\sum_{n=1}^{K} i(k-K+n) \cdot e^{\left(-j\frac{2n\Pi}{N}\right)}$$

wherein K and N are predefined constants;

(3) said DFT of the DC component is computed in accordance with one of the following equations:

(i) for $K=N/2$, $$I_{dc}(k) = \left(i(k) + i\left(k - \frac{N}{2}\right)\right)\frac{4}{N}(MF1 + jMF2)$$

(ii) for $K=N$, $$I_{dc}(k) = (i(k-N) - i(k))\frac{2}{N}(MF1 + jMF2)$$

where MF1 and MF2 are modification factors and are derived as follows:

$$MF1 = \frac{\cos\left(\frac{2\pi}{N}\right) - e^{\frac{-T_s}{T_1}}}{e^{\frac{T_s}{T_1}} - 2\cos\left(\frac{2\pi}{N}\right) + e^{\frac{-T_s}{T_1}}}$$

$$MF2 = \frac{-\sin\left(\frac{2\pi}{N}\right)}{e^{\frac{T_s}{T_1}} - 2\cos\left(\frac{2\pi}{N}\right) + e^{\frac{-T_s}{T_1}}}$$

wherein N is the number of samples per cycle, T1 is a time constant defining a rate at which the DC component decays, and $T_s$ is a sample interval; and (e) means for performing a prescribed protective relaying function using said phasor.

* * * * *